United States Patent

Saka

Patent Number: 4,863,248
Date of Patent: Sep. 5, 1989

[54] SINGLE COLLIMATOR LENS
[75] Inventor: Manami Saka, Osaka, Japan
[73] Assignee: Minolta Camera Kabushiki Kaisha, Osaka, Japan
[21] Appl. No.: 274,298
[22] Filed: Nov. 21, 1988
[30] Foreign Application Priority Data Nov. 24, 1987 [JP] Japan .................. 62-297116

[51] Int. Cl.[4] ........................... G02B 13/18
[52] U.S. Cl. ................................ 350/432
[58] Field of Search ................. 350/432–435

[56] References Cited

U.S. PATENT DOCUMENTS

| | | | |
|---|---|---|---|
| 4,027,952 | 6/1977 | Hugues | 350/432 |
| 4,449,792 | 5/1984 | Arai et al. | 350/432 |
| 4,571,034 | 2/1986 | Nakamura | 350/432 |
| 4,613,212 | 9/1986 | Norikazu | 350/432 |
| 4,641,929 | 2/1987 | Braat | 350/432 |
| 4,647,352 | 4/1987 | Suda et al. | 350/432 |
| 4,671,623 | 6/1987 | Chikuma | 350/432 |
| 4,743,093 | 5/1988 | Oinen | 350/432 |
| 4,765,723 | 8/1988 | Takamura | 350/432 |
| 4,768,867 | 9/1988 | Suda | 350/432 |

FOREIGN PATENT DOCUMENTS

| | | |
|---|---|---|
| 60-126617 | 7/1985 | Japan . |
| 60-129704 | 7/1985 | Japan . |
| 60-247611 | 12/1985 | Japan . |
| 61-132915 | 6/1986 | Japan . |
| 61-147212 | 7/1986 | Japan . |
| 61-281210 | 12/1986 | Japan . |
| 62-14611 | 1/1987 | Japan . |
| 63-58310 | 3/1988 | Japan . |

Primary Examiner—Bruce Y. Arnold
Assistant Examiner—Scott J. Sugarman
Attorney, Agent, or Firm—Price, Gess & Ubell

[57] ABSTRACT

A collimator lens of a single lens type having a convex aspherical surface on the collimated light side and a plane surface on the condensed light side fulfills the following conditions:

$$0.0003 < \left(2NA\frac{t}{f}\right)^2 < 0.03$$

$$1.00 \leq \frac{n-1}{r} \cdot f \leq 1.01$$

wherein f represents a focal length of the collimator lens; t represents an axial distance of the collimator lens; NA represents a numerical aperture of the collimator lens; n represents a refractive index of the collimator lens; r represents a radius of curvature of the convex aspherical surface in the paraxial region. According to the collimator lens of a single lens type thus configurated, short axial distance and light weight can be realized, which makes it possible to be formed by the liquid glass drop method. In addition, the collimator lens of a single lens type which keeps good balance of an axial aberration and an off-axial aberration is obtainable.

4 Claims, 5 Drawing Sheets

NA 0.133

— 780

-0.005  0.005
SPHERICAL
ABERRATION

Y' 0.396

---- DM
— DS

-0.005  0.005
ASTIGMATISM

Y' 0.396

-0.0002  0.0002
DISTORTION(%)

NA 0.133

— 780

-0.005  0.005
SPHERICAL
ABERRATION

Y' 0.396

---- DM
— DS

-0.005  0.005
ASTIGMATISM

Y' 0.396

-0.0002  0.0002
DISTORTION(%)

NA 0.153

— 780

-0.005 0.005
SPHERICAL
ABERRATION

Y' 0.345

---- DM
—— DS

-0.005 0.005
ASTIGMATISM

Y' 0.345

-0.0002 0.0002
DISTORTION(%)

NA 0.25

— 780

-0.005 0.005
SPHERICAL
ABERRATION

Y' 0.141

---- DM
—— DS

-0.005 0.005
ASTIGMATISM

Y' 0.141

-0.0005 0.0005
DISTORTION(%)

NA 0.153

— 780

-0.005 0.005
SPHERICAL
ABERRATION

Y' 0.345

---- DM
—— DS

-0.005 0.005
ASTIGMATISM

Y' 0.345

-0.0002 0.0002
DISTORTION(%)

NA 0.153

— 780

-0.005  0.005
SPHERICAL
ABERRATION

Y' 0.345

---- DM
—— DS

-0.005  0.005
ASTIGMATISM

Y' 0.345

-0.0005  0.0005
DISTORTION(%)

NA 0.25

— 780

-0.005  0.005
SPHERICAL
ABERRATION

Y' 0.141

---- DM
—— DS

-0.005  0.005
ASTIGMATISM

Y' 0.141

-0.0002  0.0002
DISTORTION(%)

NA 0.25

— 780

-0.005  0.005
SPHERICAL
ABERRATION

Y' 0.14

---- DM
—— DS

-0.005  0.005
ASTIGMATISM

Y' 0.14

-0.0005  0.0005
DISTORTION(%)

y=0 y=0 y=0.396 y=0.396 y=0 y=0 y=0.345 y=0.141 y=0 y=0 y=0.345 y=0.345 y=0 y=0 y=0.141 y=0.141

SINGLE COLLIMATOR LENS

BACKGROUND OF THE INVENTION

1. Field of the Invention

The present invention relates to a collimator lens of a single lens type.

2. Description of the Prior Art

A pickup for laser disk system such as a compact disk player or a digital audio disk player necessitates a collimator lens, by which light generated from a light source of semiconductor laser is condensed and collimated to be, in turn, converged onto a disk through an objective lens arranged next to the collimator lens.

In this field of art, there have been various types of prior art developed including a method of forming a single lens applicable to the collimator lens.

In the Japanese Patent Laid-Open No. 146721/1986, for example, a glass lens forming method is disclosed. In this method, a melted liquid glass is dropped down to the air from a nozzle. During the dropping, a surface of the glass drop is formed into spherical surface by means of the surface tension by itself. The glass drop is received by a mold and then pressed so that the glass gob is made into a glass lens with desired shape. Hereinafter, such a glass lens forming method is referred to as "the liquid glass drop method". The liquid glass drop method has an advantage in that there is no necessity of grinding the lens surface after shaped by the mold.

In the liquid glass drop method, however, the volume of the dropped glass is limited, which makes it impossible to form a lens of an axial distance greater than a limit.

However, a prior art collimator lens of a single lens type such as disclosed in the U.S. Pat. No. 4,613,213, U.S. Pat. No. 4,657,352 and the Japanese Patent Laid-Open No. 132915/1986 each requires an axial distance considerably long in comparison with the radius of curvature. Similarly, the Japanese Patent Laid-Open No. 14611/1987 discloses a microlens for optical fibers, which has a long axial distance. Further, in a viewpoint of correcting a spherical aberration well in a collimator lens, especially a plano-convex lens, whose numerical aperture NA is about 0.25, the axial distance is required to be long enough.

Thus, the prior art has only provided the field of collimator lens with a single lens of a heavy weight because of its long axial distance, which is, on the other hand difficult to be formed by the above-described liquid glass drop method or the like.

SUMMARY OF THE INVENTION

An object of the present invention is to provide a single lens type collimator lens with a suitable shape capable of being formed through the liquid glass drop method.

Another object of the present invention is to provide a single lens type collimator lens of well-corrected aberrations in spite of its short axial distance and light weight.

Still another object of the present invention is to provide a single lens type collimator lens having a wave front aberration with well acceptable off-axial aberration such as a coma.

In accordance with the present invention, a collimator lens of a single lens type has a convex aspherical surface on the collimated light side and a plane surface on the condensed light side, and fulfills the following conditions:

$$0.0003 < \left(2NA\frac{t}{f}\right)^2 < 0.03$$

$$1.00 \leq \frac{n-1}{r} \cdot f \leq 1.01$$

wherein, f represents a focal length of the collimator lens, t represents an axial distance of the collimator lens, NA represents a numerical aperture, n represents a refractive index of the collimator lens, and r represents a radius of curvature of the convex aspherical surface in the paraxial region.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

DETAILED DESCRIPTION OF THE PREFERRED EMBODIMENTS

The following description is provided to enable any person skilled in the optical field to make and use the invention and sets forth the best modes contemplated by the inventor for carrying out his invention. Various modifications, however, will remain readily apparent to those skilled in the art, since the generic principles of the present invention have been defined herein specifically to provide a relatively economical and easily manufactured single collimator lens. The derivation of the formulas and the relation of the powers set forth herein can be accomplished with the assistance of a computer. The present invention represents the parameters of a compromise balance of acceptable aberrations which can be relatively easily manufactured to provide a low cost and compact for utilization with a pickup to be incorporated in a compact disk player, a digital audio disk player or the like.

Figure 1:
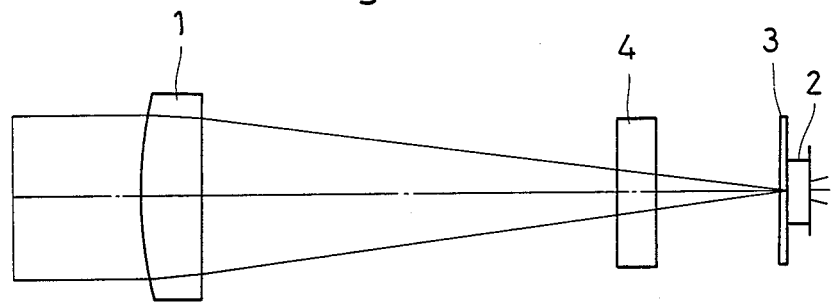
FIG. 1 represents a cross-sectional view of an embodiment in accordance with the present invention.
Figure 2A:
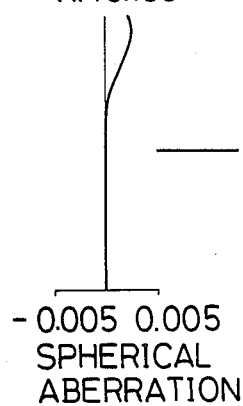
FIGS. 2a to 2c represent the abberation curves of a first embodiment.
Figure 2B:
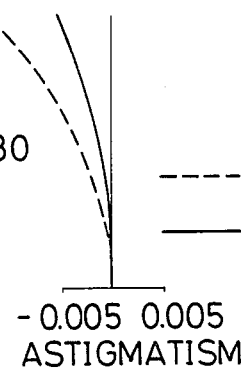
Figure 2C:
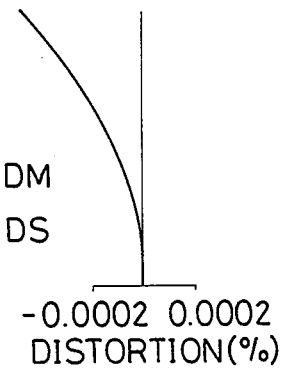
Figure 3A:
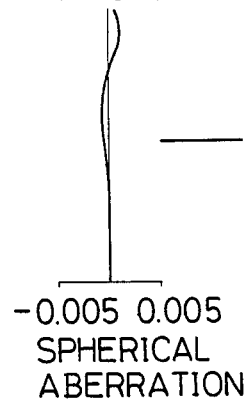
FIGS. 3a to 3c represent the abberation curves of a second embodiment.
Figure 3B:
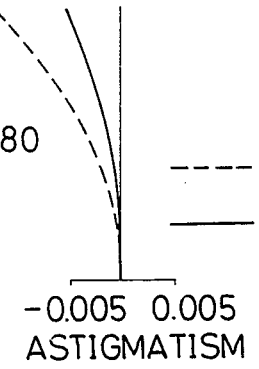
Figure 3C:
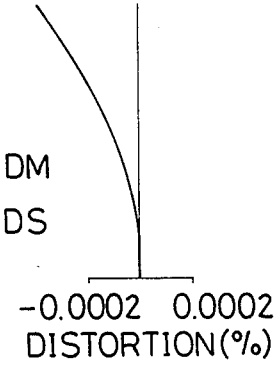
Figure 4A:
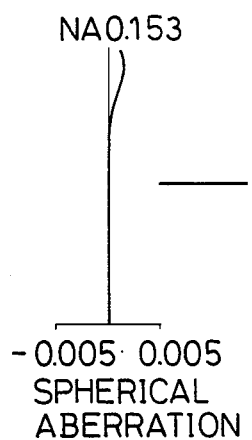
FIGS. 4a to 4c represent the aberration curves of a third embodiment.
Figure 4B:
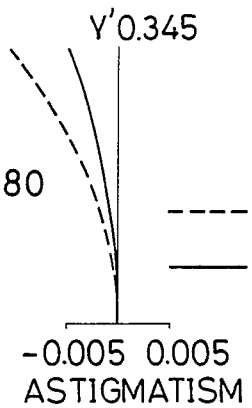
Figure 4C:
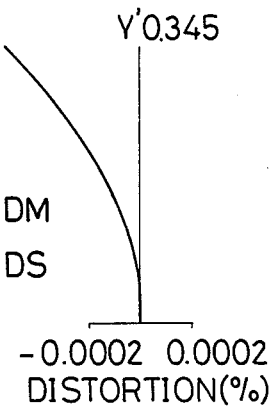
Figure 5A:
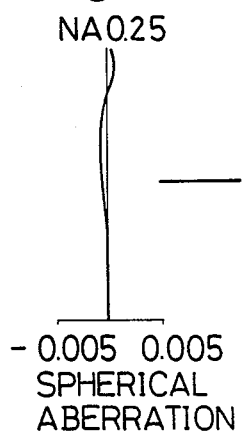
FIGS. 5a to 5c represent the aberration curves of a fourth embodiment.
Figure 5B:
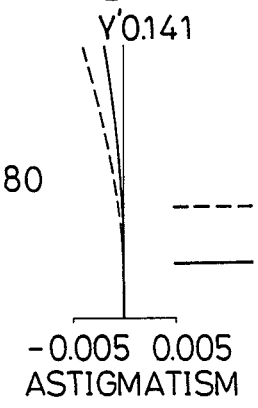
Figure 5C:
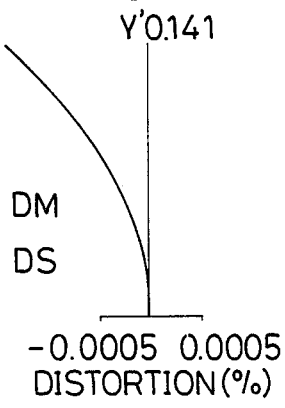
Figure 6A:
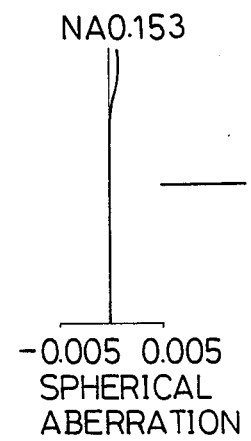
FIGS. 6a to 6c represent the aberration curves of a fifth embodiment.
Figure 6B:
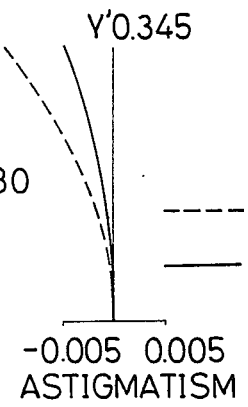
Figure 6C:
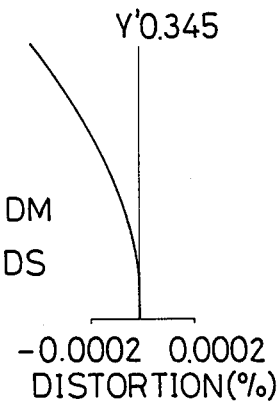
Figure 7A:
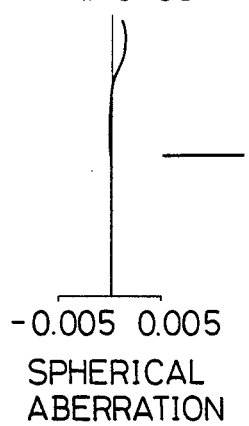
FIGS. 7a to 7c represent the aberration curves of a sixth embodiment.
Figure 7B:
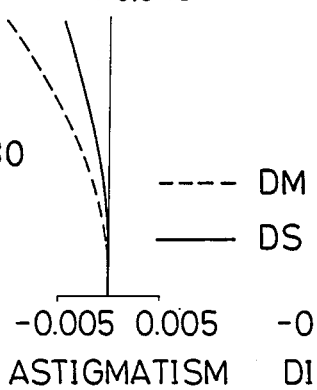
Figure 7C:
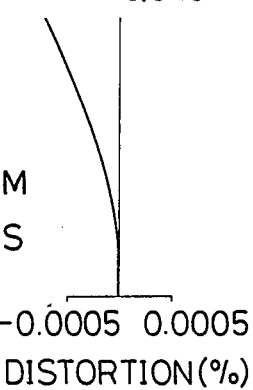
Figure 8A:
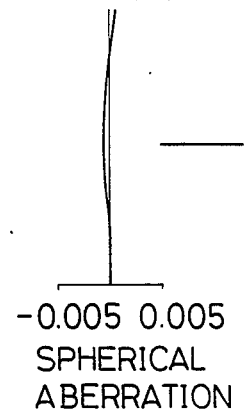
FIGS. 8a to 8c represent the aberration curves of a seventh embodiment.
Figure 8B:
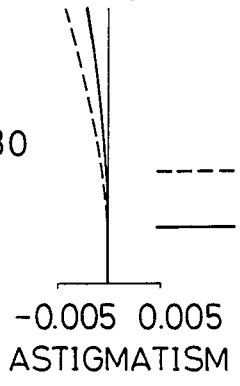
Figure 8C:
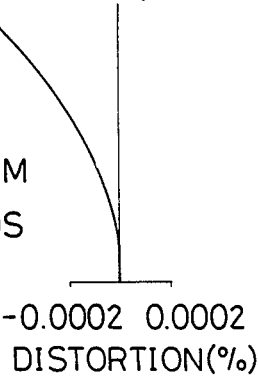
Figure 9A:
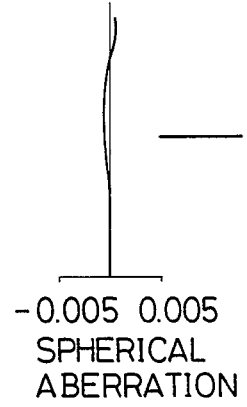
FIGS. 9a to 9c represent the aberration curves of an eighth embodiment.
Figure 9B:
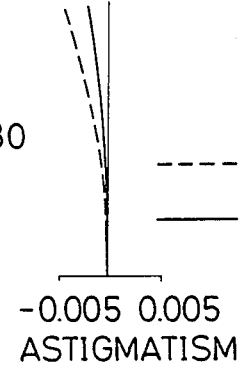
Figure 9C:
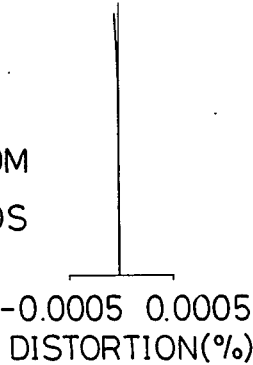
Figure 10A:
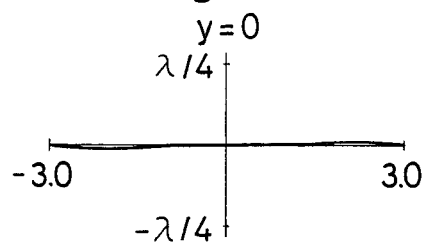
FIGS. 10a and 10b represent the wave front aberration curves of the first embodiment.
Figure 11A:
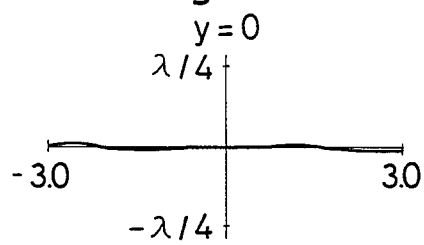
FIGS. 11a and 11b represent the wave front aberration curves of the second embodiment.
Figure 10B:
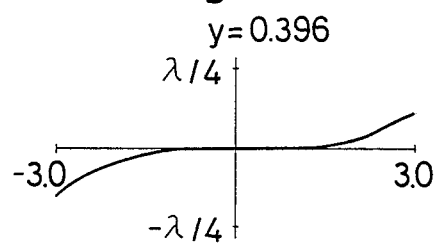
Figure 11B:
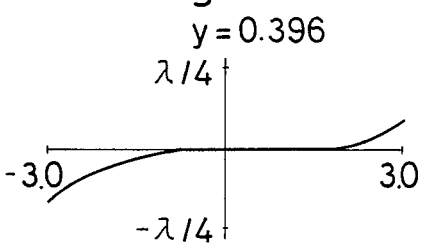
Figure 12A:
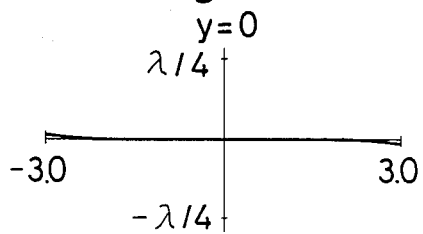
FIGS. 12a and 12b represent the wave front aberration curves of the third embodiment.
Figure 13A:
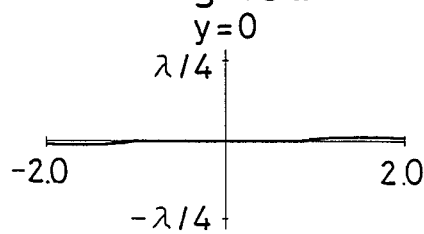
FIGS. 13a and 13b represent the wave front aberration curves of the fourth embodiment.
Figure 12B:
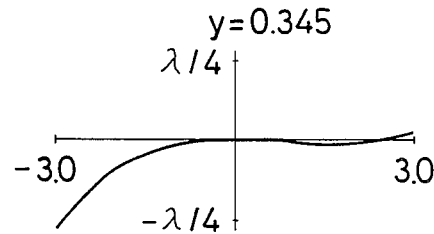
Figure 13B:
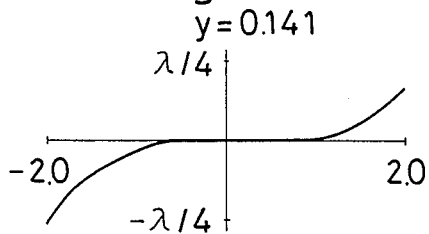
Figure 14A:
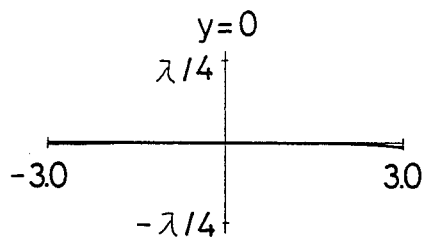
FIGS. 14a and 14b represent the wave front aberration curves of the fifth embodiment.
Figure 15A:
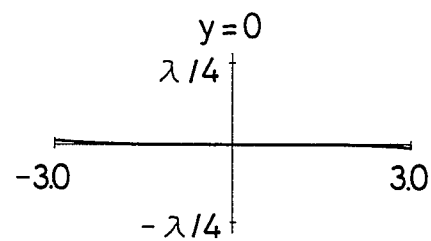
FIGS. 15a and 15b represent the wave front aberration curves of the sixth embodiment.
Figure 14B:
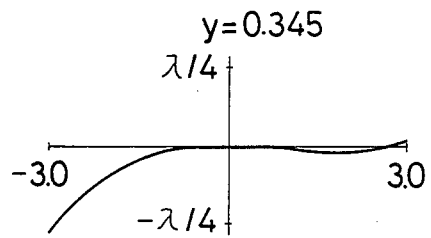
Figure 15B:
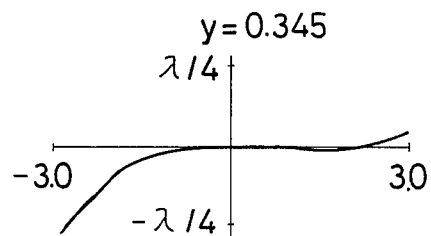
Figure 16A:
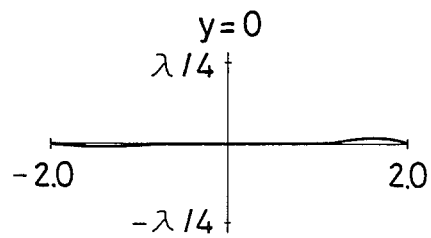
FIGS. 16a and 16b represent the wave front aberration curves of the seventh embodiment.
Figure 17A:
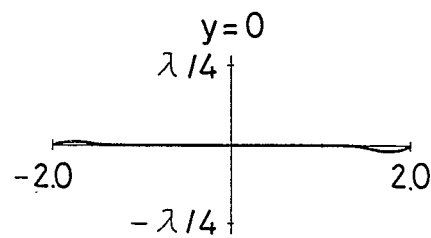
FIGS. 17a and 17b represent the wave front aberration curves of the eighth embodiment.
Figure 16B:
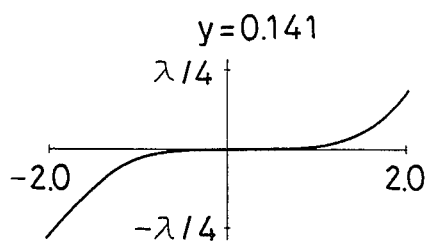
Figure 17B:
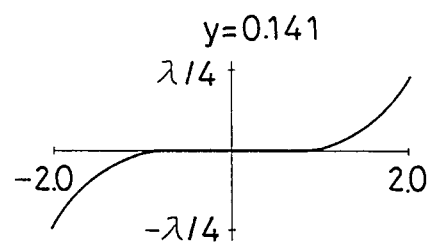

According to FIG. 1, numeral 1 designates a collimator lens according to the present invention, numeral 2 a semiconductor laser, numeral 3 a cover glass, and numeral 4 a grating grid. The light ray emitted from laser 2 travels from the right to the left in FIG. 1. The collimator lens 1 has a convex aspherical surface $r_1$ on the collimated light side and fulfills the following conditions:

$$0.0003 < \left(2NA\frac{t}{f}\right)^2 < 0.03 \qquad 1$$

$$1.00 \leq \frac{n-1}{r} \cdot f \leq 1.01 \qquad 2$$

wherein, f represents a focal length of the collimater lens,
t represents an axial distance of the collimator lens,
NA represents a numerical aperture,
n represents a refractive index of the collimator lens, and
r represents a radius of curvature of the convex aspherical surface in the paraxial region.

If a value exceeding the upper limit of Condition 1 which relates to the off-axial aberration is taken, the diameter of the lens and the axial distance of the collimator lens become large. In other words, the volume of the collimator lens becomes large, which makes it impossible that the collimator lens is formed by the liquid glass drop method. On the other hand, if a value exceeding the lower limit of Condition 1 is taken, the off-axial coma can not be corrected enough and the wave front aberration becomes larger than $\frac{1}{4}\lambda$ which is the Rayleigh limit.

Condition 2 relates to balance of the axial aberration and the off-axial aberration. If the value exceeds the limit of this condition, off-axial coma becomes so large that the balance of the axial aberration and the off-axial aberration turns for worse even if an aspherical surface is adopted.

The collimator lens according to the present invention may preferably be configured so as to fulfill the following condition in addition to Conditions 1 and 2:

$$0.016 < \frac{ftNA}{r^2} < 0.14 \qquad 3$$

Condition 3 relates to the axial aberration, and if the value exceeds the upper limit of this condition, the radius of curvature becomes small and the axial distance and the diameter of the lens become large, which result in a shape difficult to be formed by the liquid glass drop method or the like. On the other hand, if the value exceeds the lower limit of Condition 3, the spherical aberration becomes so large that the spherical aberration is no more corrected with the off-axial aberration kept small enough.

Furthermore, the collimator lens according to the present invention is recommended to be configurated so as to fulfill the following condition in addition to Conditions 1, 2 and 3:

$$-0.001 > \frac{\delta}{fNA^2} > -0.0116 \qquad 4$$

wherein, $\delta$ represent a deviation of the aspherical surface from an imaginary (basic) spherical surface with the radius of curvature of r at the height of effective diameter (if the refractive power of the aspherical surface is smaller than that of the imaginary spherical surface, $\delta$ is negative).

Condition 4 also relates to the axial aberration, and if the value exceeds the lower limit of this condition, a deviation from the paraxial spherical surface becomes so large that the adoption of the liquid glass drop method is difficult. If the value exceeds the upper limit of Condition 4, the increase of the axial wave front aberration could not be corrected well for all the adoption of any aspherical surface.

Furthermore, according to the present invention, a refractive index of this single lens type collimator lens is desirable to fulfill the following condition:

$$n \geq 1.73 \qquad 5$$

wherein, n represents a refractive index of the collimator lens.

If the value is less than 1.73, radius of curvature of the convex aspherical surface r is requested to be small to obtain a predetermined focal length, so that the spherical aberration becomes large. In order to correct this spherical aberration well, a deviation of the aspherical surface from a spherical surface of the convex surface side becomes so large that it is difficult to be formed with high-precision.

It is desirable to form this single lens type collimator lens with a plano-convex lens.

The following Tables 1 to 8 disclose, respectively, the first through eighth embodiments of the present invention. In the Tables, NA is the numerical aperture, f is the focal length of the collimator lens, $r_1$ is the radius of curvature of the basic spherical surface of the convex side surface, $r_2$ is the radius of curvature of the other side surface, $n_1$ is the refractive index at 780 nm of wavelength, and $t_1$ is the axial thickness.

Further, the aspherical convex surface is defined by the following formula:

$$X = \frac{C_0 y^2}{1 + \sqrt{1 - C_0^2 y^2}} + \sum_i A_{2i} y^{2i}$$

wherein; X represents the coordinate along the optical axis measured from the top of the basic (paraxial) spherical surface toward the condensed light side; y represents the coordinate perpendicular to the optical axis measured from the optical axis (height from the optical axis); Co represents the curvature of the basic spherical surface of radius of curvature $r_1$ ($C_0 = 1/r_1$); and $A_{2i}$ represents the aspheric surface coefficient.

FIGS. 2a to 2c through FIGS. 9a to 9c represent aberration curves for the first through eighth embodiments, respectively, in which the spherical aberration is obtained at 780 nm of wavelength. The broken line DM and the solid line DS show astigmatisms in a meridional image plane and a sagittal image plane, respectively.

TABLE 1

| {Embodiment 1} | |
|---|---|
| NA | 0.133 |
| f | 22.5 |
| $r_1$ | 17.606 |
| $n_1$ | 1.78251 |
| $t_1$ | 2.25 |
| $r_2$ | ∞ |
| $A_4$ | $-0.16038 \times 10^{-4}$ |
| $A_6$ | $0.10677 \times 10^{-6}$ |
| $A_8$ | $-0.27735 \times 10^{-7}$ |
| $A_{10}$ | $0.14148 \times 10^{-8}$ |

TABLE 2

| {Embodiment 2} | |
|---|---|
| NA | 0.133 |
| f | 22.5 |
| $r_1$ | 17.606 |
| $n_1$ | 1.78251 |
| $t_1$ | 2.00 |
| $r_2$ | ∞ |
| $A_4$ | $-0.16038 \times 10^{-4}$ |
| $A_6$ | $0.10677 \times 10^{-6}$ |
| $A_8$ | $-0.27735 \times 10^{-7}$ |
| $A_{10}$ | $0.14148 \times 10^{-8}$ |

TABLE 3

| {Embodiment 3} | |
|---|---|
| NA | 0.153 |
| f | 19.6 |
| $r_1$ | 15.337 |
| $n_1$ | 1.78251 |
| $t_1$ | 3.00 |
| $r_2$ | ∞ |
| $A_4$ | $-0.24001 \times 10^{-4}$ |
| $A_6$ | $0.99611 \times 10^{-7}$ |
| $A_8$ | $-0.30064 \times 10^{-7}$ |
| $A_{10}$ | $0.14568 \times 10^{-8}$ |

TABLE 4

| {Embodiment 4} | |
|---|---|
| NA | 0.25 |
| f | 8.0 |
| $r_1$ | 6.260 |
| $n_1$ | 1.78251 |
| $t_1$ | 2.60 |
| $r_2$ | ∞ |
| $A_4$ | $-0.33179 \times 10^{-3}$ |
| $A_6$ | $-0.28756 \times 10^{-5}$ |
| $A_8$ | $-0.18803 \times 10^{-5}$ |
| $A_{10}$ | $0.20078 \times 10^{-6}$ |

TABLE 5

| {Embodiment 5} | |
|---|---|
| NA | 0.153 |
| f | 19.6 |
| $r_1$ | 15.337 |
| $n_1$ | 1.78251 |
| $t_1$ | 2.7 |
| $r_2$ | ∞ |
| $A_4$ | $-0.23959 \times 10^{-4}$ |
| $A_6$ | $0.14949 \times 10^{-7}$ |
| $A_8$ | $-0.16571 \times 10^{-7}$ |
| $A_{10}$ | $0.81259 \times 10^{-9}$ |

TABLE 6

| {Embodiment 6} | |
|---|---|
| NA | 0.153 |
| f | 19.6 |
| $r_1$ | 15.337 |
| $n_1$ | 1.78251 |
| $t_1$ | 3.6 |
| $r_2$ | ∞ |
| $A_4$ | $-0.23724 \times 10^{-4}$ |
| $A_6$ | $0.89553 \times 10^{-7}$ |
| $A_8$ | $-0.28492 \times 10^{-7}$ |
| $A_{10}$ | $0.13807 \times 10^{-8}$ |

TABLE 7

| {Embodiment 7} | |
|---|---|
| NA | 0.25 |
| f | 8.0 |
| $r_1$ | 6.260 |
| $n_1$ | 1.78251 |
| $t_1$ | 2.5 |
| $r_2$ | ∞ |
| $A_4$ | $-0.32786 \times 10^{-3}$ |
| $A_6$ | $-0.85362 \times 10^{-5}$ |
| $A_8$ | $0.54088 \times 10^{-8}$ |
| $A_{10}$ | $0.12454 \times 10^{-10}$ |

TABLE 8

| {Embodiment 8} | |
|---|---|
| NA | 0.25 |
| f | 8.0 |
| $r_1$ | 6.2076 |
| $n_1$ | 1.78371 |
| $t_1$ | 2.6 |
| $r_2$ | 511.5562 |
| $A_4$ | $-0.32969 \times 10^{-3}$ |
| $A_6$ | $-0.33599 \times 10^{-5}$ |
| $A_8$ | $-0.17306 \times 10^{-5}$ |
| $A_{10}$ | $0.18294 \times 10^{-6}$ |

Although the present invention has been fully described by way of example with reference to the acompanying drawings, it is to be noted here that various changes and modifications will be apparent to those skilled in the art. Therefore, unless otherwise such changes and modifications depart from the scope of the present invention, they should be construed as being included therein.

What is claimed is:

1. A collimator lens of a single lens type having a convex aspherical surface on the collimated light side wherein the collimator lens fulfills the following conditions:

$$0.0003 < \left(2NA\frac{t}{f}\right)^2 < 0.03$$

$$1.00 \leq \frac{n-1}{r} \cdot f \leq 1.01$$

wherein,
f represents a focal length of the collimator lens;
t represents an axial distance of the collimator lens;
NA represents a numerical aperture of the collimator lens;
n represents a refractive index of the collimator lens;
r represents a radius of curvature of the convex aspherical surface in the paraxial region.

2. The invention of claim 1, wherein the collimator lens has a plane surface on the condensed light side.

3. The invention of claim 2, wherein the collimator lens further fulfills the following condition:

$$0.016 < \frac{ftNA}{r^2} < 0.14$$

4. The invention of claim 3, wherein the collimator lens further fulfills the following condition:

$$-0.001 > \frac{\delta}{fNA^2} > -0.0116$$

wherein,
$\delta$ represents a deviation of the aspherical surface from an imaginary spherical surface with the radius of curvature of r at the height of effective diameter, and wherein
$\delta$ is negative if the refractive power of the aspherical surface is smaller than that of the imaginary spherical surface.

* * * * *